United States Patent Office 3,810,911
Patented May 14, 1974

3,810,911
N,N-DIMETHYL-O-[1-ALKYL - 4 - CYANO-5-ALKOXYPYRAZOL(3)YL]-CARBAMIC ACID ESTERS
Hellmut Hoffmann, Wuppertal-Elberfeld, and Ingeborg Hammann, Cologne, Germany, assignors to Bayer Aktiengesellschaft, Leverkusen, Germany
No Drawing. Filed Jan. 31, 1972, Ser. No. 222,289
Claims priority, application Germany, Feb. 10, 1971, P 21 06 303.6
Int. Cl. C07d 49/18
U.S. Cl. 260—310 R         5 Claims

ABSTRACT OF THE DISCLOSURE

N,N-dimethyl-O-[1-alkyl - 4 - cyano - 5 - alkoxypyrazol-(3)yl]-carbamic acid esters of the general formula

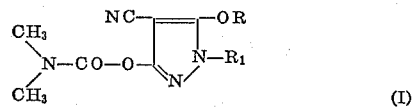

(I)

in which

R and $R_1$ are each lower alkyl radicals, which possess acaricidal and insecticidal properties.

---

The present invention relates to and has for its objects the provision of particular new N,N-dimethyl-O-[1-alkyl-4-cyano-5-alkoxypyrazol(3)yl]-carbamic acid esters, i.e. O-[1-lower alkyl-4-cyano-5-lower alkoxypyrazol(3)yl]-carbamic acid esters, which possess acaricidal and insecticidal properties, active compositions in the form of mixtures of such compounds with solid and liquid dispersible carrier vehicles, and methods for producing such compounds and for using such compounds in a new way especially for combating pests, e.g. acarids and insects, with other and further objects becoming apparent from a study of the within specification and accompanying examples.

From Swiss patent specification 282,655 it is known that pyrazolylcarbamic acid esters, such as N,N-dimethyl-O-[1-phenyl - 3 - methylpyrazol(5)yl]-carbamic acid ester (Compound A), possess insecticidal properties.

The present invention provides N,N-dimethyl-O-[1-alkyl - 4 - cyano - 5 - alkoxypyrazol(3)yl]-carbamic acid esters of the general formula

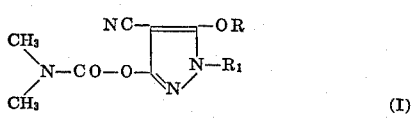

(I)

in which R and $R_1$ are each lower alkyl radicals.

These compounds are distinguished by a strong insecticidal and acaricidal effectiveness.

R and $R_1$ are preferably alkyl of 1 to 4 carbon atoms, R advantageously being methyl or ethyl, and $R_1$ advantageously being methyl.

The invention also provide a process for the production of a N,N - dimethyl - O - [1-alkyl-4-cyano-5-alkoxypyrazol(3)yl]-carbamic acid ester of the Formula I in which (a) A 1-alkyl-3-hydroxy-4-cyano-5-alkoxypyrazole of the general formula

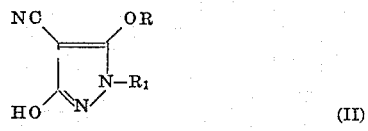

(II)

in which
R and $R_1$ have the meanings stated above, is reacted in the form of an alkali metal salt, alkaline earth metal salt or ammonium salt, or in the presence of an acid-binding agent, with N,N-dimethylcarbamic acid chloride of the formula $$(CH_3)_2N{-}CO{-}Cl \qquad (III)$$

or (b) A pyrazole derivative of the Formula II is reacted with an excess of phosgene to give the corresponding chloroformic acid ester and this ester is reacted with dimethylamine, or (c) A pyrazole derivative of the Formula II is reacted with the equivalent amount of phosgene to give the corresponding bis-(pyrazolyl)-carbonate and this carbonate is split up with dimethylamine.

Surprisingly, the compounds according to the invention possess a substantially better insecticidal activity than the known pyrazolylcarbamic acid esters of analogous constitution and of the same direction of activity. The substances according to the invention therefore represent a genuine enrichment of the art.

If N,N-dimethylcarbamic acid chloride and 1-methyl-3-hydroxy-4-cyano-5-methoxypyrazole are used as starting materials, the reaction course can be represented by the following formula scheme:

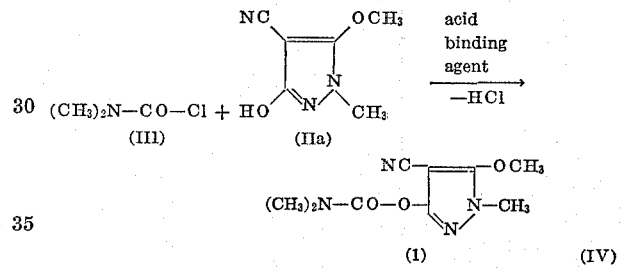

The N,N-dimethylcarbamic acid chloride of Formula III to be used as starting material is known from the literature. The pyrazole derivatives of the Formula II can be obtained by reaction of cyanoacetic acid alkyl esters, dithiocarbonic acid esters and alcoholate to give the compounds of the general formula

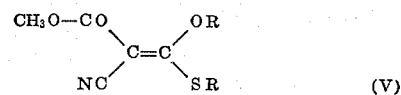

(V)

and subsequent cyclization with monoalkylhydrazine.

Process variants (a), (b) and (c) are preferably carried out with the use of a solvent which term includes a mere diluent.

Practically all inert organic solvents are suitable. These include, in particular, aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, such as acetone, methyl ethyl ketone, methylisopropyl ketone and methylisobutyl ketone; and nitriles, such as acetonitrile and propionitrile.

As acid acceptors, all customary acid-binding agents can be used. Particularly good results have been obtained with alkali metal carbonates and alcoholates, for example sodium or potassium carbonate, methylate or ethylate; and aliphatic, aromatic or heterocyclic amines, for example triethylamine, dimethylamine, dimethylaniline, dimethylbenzylamine or pyridine.

The reaction temperature can be varied within a fairly wide range. In general, the reaction is carried out at about 0 to 150, preferably at about 25 to 80° C.

The reactions are, in general, carried out under normal pressure.

In process variant (a), the starting materials are, in general, used in equivalent amounts.

In the first step of process variant (b), the reaction is preferably carried out at a pH value below about 7; in the first step of process variant (c), preferably at a pH of approximately 8.

The working up of the reaction mixture may be carried out in customary manner.

The compounds according to the invention are generally obtained in crystalline form and can be characterized by their melting points.

As already mentioned, the new N,N-dimethyl-O-[1-alkyl-4-cyano-5-alkoxypyrazol(3)yl]-carbamic acid esters are distinguished by an outstanding insecticidal and acaricidal effectiveness against plant pests. They possess a good activity against both sucking and eating insects and mites. At the same time, they exhibit a low phytotoxicity. For this reason, the compounds according to the invention may be used with success as pesticides in crop protection.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealbugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*) the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Epthestia kühniella*) and greater wax moth (*Galleria mellonella*); and the like.

Also to be classed with the biting insects contemplated herein are bettles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthosceldies obtectus*), the leather beetle (*Dermestes frischi*), the khapra beetle (*Trogoderma granarium*), the flour beetle (*Tribolium castaneum*), the northern corn billbug (*Calandra* or *Sitophilus zeamasi*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Hen-schoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) the bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylenes, alkyl naphthalenes, etc.), halogenated, especially chlorinated, aromatic hydrocarbons (e.g. chlorobenzenes, etc.), cyclohexane, paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), ethers, amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), acetonitrile, and/or water; as well as inert dispersible finely-divided solid carriers, such as ground natural minerals (e.g. kaolins, clays, alumina, silica, chalk, i.e. calcium carbonate, talc, attapulgite, montmomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, bactericides, yeasticides, nematocides, rodenticides, herbicides, fertilizers, growth-regulating agents, soil structure improvement agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–1000 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

Myzus test (contact action)

Solvent: 3 parts by weight dimethyl formamide
Emusifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested wtih peach aphids (*Myzus Persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation, times and the results can be seen from the following Table 1.

TABLE 1
(Myzus test)

| Active compound | | Concentration of active compound | Degree of destruction in percent after 1 day |
|---|---|---|---|
| CH₃ structure ...—O—C(=O)—N(CH₃)₂ (known) | (A) | 0.1<br>0.02<br>0.002 | 100<br>35<br>0 |
| CH₃O—, CH₃—N ring —CN, —O—C(=O)—N(CH₃)₂ | (1) | 0.2<br>0.02<br>0.002 | 100<br>100<br>90 |
| C₂H₅O—, CH₃—N ring —CN, —O—C(=O)—N(CH₃)₂ | (2) | 0.2<br>0.02 | 100<br>95 |

EXAMPLE 2

Doralis test (systemic action)

Solvent: 3 parts by weight dimethyl formamide
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all the aphids are killed; 0% means that none of the aphids are killed.

The active compounds, the concentrations of the active compounds, the evaluation time and the results can be seen from the following Table 2.

TABLE 2
Doralis test/systemic action

| Active compound | | Concentration of active compound in percent | Degree of destruction in percent after 4 days |
|---|---|---|---|
| CH₃-pyrazole-H with -O-C(=O)-N(CH₃)₂ and phenyl (known) | (A) | 0.2<br>0.02<br>0.002 | 100<br>100<br>0 |
| CH₃O-pyrazole-CN with CH₃-N and -O-C(=O)-N(CH₃)₂ | (1) | 0.2<br>0.02<br>0.002<br>0.0002 | 100<br>100<br>100<br>50 |
| C₂H₅O-pyrazole-CN with CH₃-N and -O-C(=O)-N(CH₃)₂ | (2) | 0.2<br>0.02<br>0.002 | 100<br>100<br>98 |

EXAMPLE 3

Tetranychus test

Solvent: 3 parts by weight dimethyl formamide
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

TABLE 3
Tetranychus test

| Active compound | | Concentration of active compound in percent | Degree of destruction in percent after 2 days |
|---|---|---|---|
| CH₃-pyrazole-H with -O-C(=O)-N(CH₃)₂ and phenyl (known) | (A) | 0.2 | 0 |
| CH₃O-pyrazole-CN with CH₃-N and -O-C(=O)-N(CH₃)₂ | (1) | 0.2 | 90 |

The following further examples are set forth to illustrate, without limitation, the process for producing the active compounds according to the present invention.

EXAMPLE 4

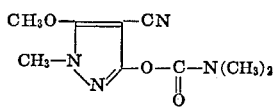

To a suspension of 31 g. (0.2 mole) of 1-methyl-3-hydroxy-4-cyano-5-methoxypyrazole and 30 g. of potassium carbonate in 300 ml. of acetonitrile there are added dropwise 22 g. of N,N-dimethylcarbamic acid chloride. The mixture is subsequently stirred at 80° C. for 3 hours; it is poured into water and the mixture is taken up in benzene. After the benzene solution has been washed until there is a neutral reaction, it is dried and the solvent is distilled off. The residue solidifies and is recrystallized from a mixture of ethyl acetate/ligroin. The yield of N,N-dimethyl-O-[1-methyl-4-cyano-5-methoxy-pyrazol(3)yl] - carbamic acid ester of melting point 101° C. is 32 g. (71% of theory).

Calculated for C₉H₁₂N₄O₃ (molecular weight 224) (percent): C, 48.2; H, 5.4; N, 25.0. Found (percent): C, 48.2; H, 5.0; N, 24.9.

EXAMPLE 5

In analogous manner, the following compounds are prepared:

| Constitution | | Melting point (° C.) | Yield (percent of theory) |
|---|---|---|---|
| C₂H₅O-pyrazole-CN with CH₃-N and -O-C(=O)-N(CH₃)₂ | (2) | 81–83 | 81 |
| NC-pyrazole-OC₃H₇-i with (CH₃)₂N-CO-O- and N-CH₃ | (3) | 60 | 88 |

The 1-methyl-3-hydroxy-4-cyano-5-methoxypyrazole of the formula

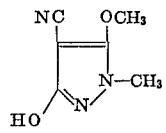

(IIa)

required as starting material can be obtained for example as follows:

To a solution of 374 g. (2.0 moles) of the compound of the formula

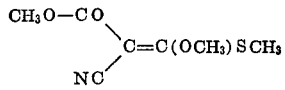

(Va)

in 1000 ml. of methanol there are added, at 10 to 20° C., 92 g. of methylhydrazine, and the mixture is stirred overnight at room temperature. The mixture is then cooled to 0° C., the separated crystalline substance is filtered off with suction and dried on clay. There are obtained 227 g. (74% of theory) of the desired 1-methyl-3-hydroxy-4-cyano-5-methoxypyrazole of the melting point 192° C.

Calculated for C₆H₇N₃O₂ (molecular weight 153) (percent): N, 27.5. Found (percent): N, 26.1.

Analogously, the corresponding ethoxy or iso-propoxy compound is obtained.

| Constitution | | Melting point (° C.) | Yield (percent of theory) |
|---|---|---|---|
| 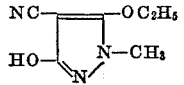 | (IIb) | 206 | 60 |
| 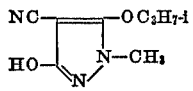 | (IIc) | 180 | 59 |

It will be appreciated that the instant specification and examples are set forth by way of illustration and not limitation, and that various modifications and changes may be made without departing from the spirit and scope of the present invention.

What is claimed is:

1. A N,N-dimethyl-O-[1-alkyl-4-cyano-5-alkoxypyrazol(3)yl]-carbamic acid ester of the formula:

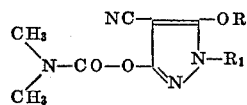

(I)

in which R and $R_1$ are each lower alkyl radicals.

2. Compound according to claim 2 in which R is methyl or ethyl, and $R_1$ is methyl.

3. The compound according to claim 1 wherein such compound is N,N-dimethyl - O - [1-methyl-4-cyano-5-methoxy-pyrazol(3)yl]-carbamic acid ester of the formula

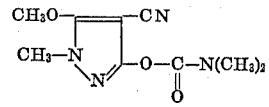

(1)

4. The compound according to claim 1 wherein such compound is N,N - dimethyl-O-[1-methyl-4-cyano-5-ethoxypyrazol(3)yl]-carbamic acid ester of the formula

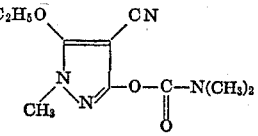

(2)

5. The compound according to claim 1 wherein such compound is N,N - dimethyl-O-[1-methyl-4-cyano-5-isopropoxypyrazol(3)yl]-carbamic acid ester of the formula

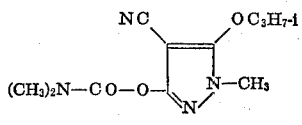

(3)

References Cited
UNITED STATES PATENTS 2,681,915   6/1954   Gysin et al. _____ 260—310

OTHER REFERENCES

Brewster, Ray Q.: "Organic Chemistry," 1948, p. 240.

HENRY R. JILES, Primary Examiner

M. M. CROWDER, Assistant Examiner

U.S. Cl. X.R.

424—273